United States Patent
Elie et al.

(10) Patent No.: US 11,614,329 B2
(45) Date of Patent: Mar. 28, 2023

(54) METHOD FOR MONITORING THE PERFORMANCE OF INERTIAL MEASUREMENT UNITS

(71) Applicant: SAFRAN ELECTRONICS & DEFENSE, Paris (FR)

(72) Inventors: Philippe Elie, Moissy-Cramayel (FR); Etienne Brunstein, Moissy-Cramayel (FR); Fabrice Delhaye, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/618,626

(22) PCT Filed: Jun. 15, 2020

(86) PCT No.: PCT/EP2020/066436
§ 371 (c)(1),
(2) Date: Dec. 13, 2021

(87) PCT Pub. No.: WO2020/249812
PCT Pub. Date: Dec. 17, 2020

(65) Prior Publication Data
US 2022/0205787 A1    Jun. 30, 2022

(30) Foreign Application Priority Data

Jun. 14, 2019 (FR) ...................................... 1906413

(51) Int. Cl.
| | |
|---|---|
| *G01C 21/16* | (2006.01) |
| *G01C 25/00* | (2006.01) |
| *G01P 21/02* | (2006.01) |

(52) U.S. Cl.
CPC ............. *G01C 21/16* (2013.01); *G01C 25/00* (2013.01); *G01P 21/02* (2013.01)

(58) Field of Classification Search
CPC ......... G01C 21/16; G01C 25/00; G01P 21/00; G01P 21/02
USPC ..................................... 73/1.38; 700/96, 104
See application file for complete search history.

(56) References Cited

FOREIGN PATENT DOCUMENTS

| | | |
|---|---|---|
| FR | 3000219 A1 | 6/2014 |
| WO | WO2019219626 A1 | 11/2019 |

OTHER PUBLICATIONS

Shoults G A et al., "Automatic Sensor and Boresignt Alignment Using Accelerometers" Proceedings of the National Aerospace and Electronics Conference. (NAECON). Dayton, May 21-25, 1990; [Proceeddings of the National Aerospace and Electronics Conference. (NAECON)] New York, IEEE, US, vol. 1 of 3, May 21, 1990, pp. 395-399.

*Primary Examiner* — Robert R Raevis
(74) *Attorney, Agent, or Firm* — Muncy, Geissler, Olds & Lowe, P.C.

(57) ABSTRACT

A method of monitoring at least first and second inertial measurement units, the first inertial measurement unit and the second inertial measurement unit being connected to the same electronic processor circuit and being arranged to determine both a specific force vector in an accelerometer measurement reference frame and also rotation data concerning turning of the accelerometer measurement reference frame relative to an inertial reference frame; the electronic processor circuit performs the steps of projecting the specific force vectors into an inertial reference frame by using the rotation data; comparing the two specific force vectors as projected into said reference frame with each other in order to determine a difference between them; and monitoring variation in this difference over time.

12 Claims, 1 Drawing Sheet

METHOD FOR MONITORING THE PERFORMANCE OF INERTIAL MEASUREMENT UNITS

The present invention relates to the field of inertially measuring a position and/or an attitude.

STATE OF THE ART

An inertial navigation system (INS) usually includes an inertial measurement unit (IMU) comprising three acceleration sensors arranged along the axes of an acceleration measurement reference frame and three angle sensors (which may be rate gyros or free gyros) for measuring angular movements of the acceleration measurement reference frame relative to a reference orientation for the measurement reference frame. Each acceleration sensor comprises a proof mass subjected to gravity and to the accelerations of the object to which the inertial navigation system is secured (e.g. a vehicle). In the acceleration measurement reference frame, the accelerometers measure a magnitude referred to as "specific force" or "g-force" and they determine the three components of a specific force vector. The specific force is equal to the sum of the non-inertial forces to which the inertial body is subjected divided by the mass of the inertial body. The specific force thus has the dimensions of an acceleration and it is also referred to as "proper acceleration" in the literature. In an inertial navigation system, the signals from the sensors of the inertial measurement unit are used by an electronic processor circuit that performs an inertial navigation algorithm on the signals to determine a position in a local geographical reference frame.

The designers of inertial units needed to monitor the drift in the performance of the inertial sensors of the inertial navigation unit in order to detect performance that does not comply with the specifications for the inertial measurement unit. Also, the designers need to be able to ensure relatively high integrity for inertial navigation systems, and for this purpose they provide inertial measurement units with redundancy.

When the navigation system has two inertial measurement units, it is known to perform navigation calculations twice over on the signals from the two inertial measurement units, and to compare the inertial navigation outputs in the local geographical reference frame in order to monitor drift of the inertial measurement units and improve the integrity of the system. Nevertheless, inertial navigation in the local geographical working reference frame is subjected to disturbances from excitation of the north and west Schuler chains and is also subject to oscillation type errors with a period of 24 hours (h) that are induced by gyro errors. These disturbances give rise to latency in detecting drift. As a result, slow drift monitoring is difficult to observe. Alternatively, if both inertial measurement units are fastened to the same rigid structure, it is possible to compare the outputs from the sensors. Nevertheless, with that method, it needs to be assumed that the structure on which the sensors are fastened is infinitely rigid, such that the inertial measurement units are subjected to the same external influences.

OBJECT OF THE INVENTION

An object of the invention is to provide simple and reliable means for detecting failures in inertial measurement units, in particular slow failures, and to do so without needing to have recourse to performing navigation calculations.

SUMMARY OF THE INVENTION

To this end, the invention provides a method of monitoring at least first and second inertial measurement units, the first inertial measurement unit and the second inertial measurement unit being connected to the same electronic processor circuit and each being arranged to determine both a specific force vector in an accelerometer measurement reference frame and also rotation data concerning turning of the accelerometer measurement reference frame relative to an inertial reference frame. The electronic processor circuit performs the steps of:
projecting the specific force vectors into an inertial reference frame by using the rotation data;
comparing the two specific force vectors as projected into said reference frame with each other in order to determine a difference between them; and
monitoring variation in this difference over time.

Projecting the specific force vectors into the inertial reference frame makes it possible to be unaffected by the effects of the Schuler chains and by oscillations having a period of 24 h, since these have no effect on the measurement of the specific forces. Projecting the specific force vectors into an inertial reference frame is made possible by making use of gyro data. Processing the differences between the specific force vectors of the two inertial measurement units makes it possible to characterize the differences in the inertial reference frame between the errors of the gyro sensors and of the accelerometer sensors in the two inertial measurement units, regardless of whether or not the units are integrated in a single apparatus. Making use of this difference in the inertial reference frame makes it possible to detect variations in the performance of the pairs of gyros and of the accelerometers in the inertial measurement units. In particular, the difference between the specific forces can be used to identify firstly random terms that can be attributed separately to accelerometer errors or to gyro errors, and secondly continuous terms that can be attributed separately to the alignment residual or to the residual of compensating lever arms. The advantage of the invention is that it makes it possible to estimate the errors relating to the sensors while using a transfer function that is simple, without making use of conventional positioning algorithms that make analysis more difficult and that make the transfer function more complicated because of the sensor errors and the locating errors (that result in particular from the effect of Schuler oscillations, from oscillations having a period of 24 h, from the initial alignment, . . . ).

The invention also provides navigation apparatus arranged to perform the method.

Other characteristics and advantages of the invention appear on reading the following description of particular, nonlimiting embodiments of the invention.

BRIEF DESCRIPTION OF THE FIGURES

Reference is made to the accompanying drawings, in which.

DETAILED DESCRIPTION OF THE INVENTION

Figure 1:
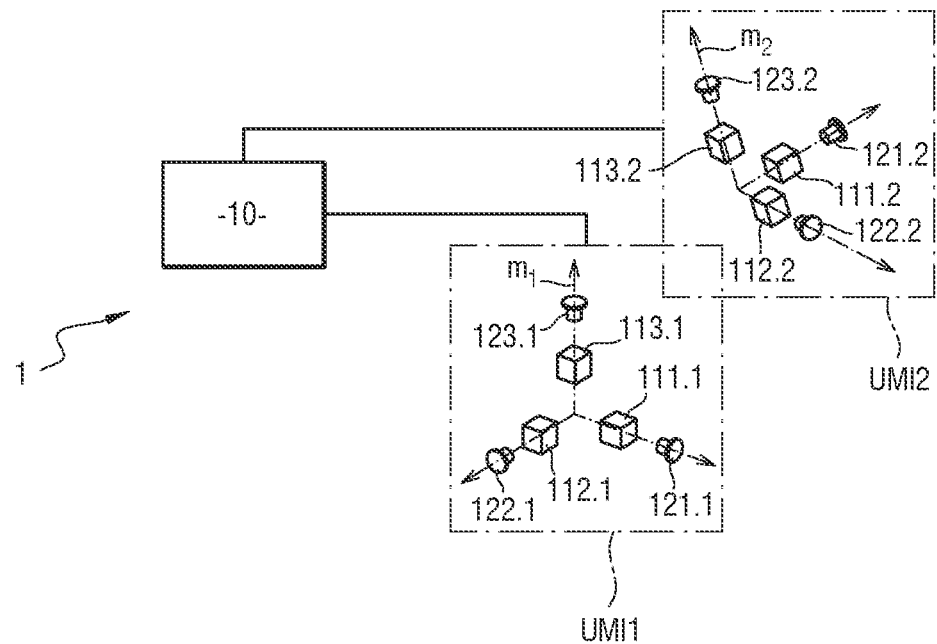
FIG. 1 is a diagrammatic plan view of navigation apparatus performing the method of the invention.
Figure 2:
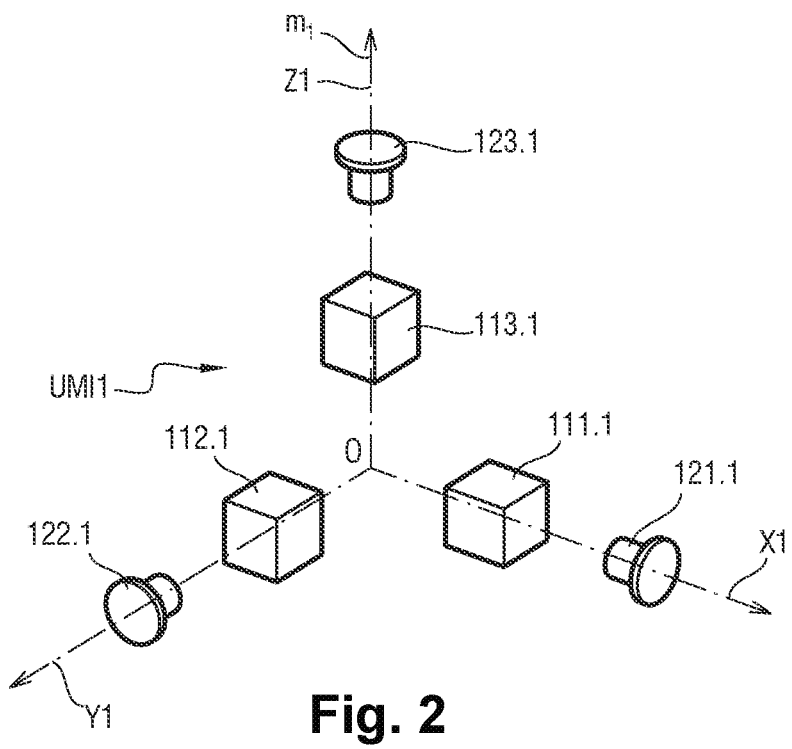
FIG. 2 is a diagrammatic view of an inertial navigation system in the apparatus.

With reference to the figures, the invention relates to navigation apparatus 1 for a vehicle. The vehicle may be of any type: air; water; or land.

In this example, the navigation apparatus 1 comprises an electronic processor circuit 10 connected to two inertial measurement units IMU1 and IMU2.

The inertial measurement unit IMU1 has three accelerometers 111.1, 112.1, and 113.1 arranged on the axes X1, Y1, and Z1 of an accelerometer reference frame $m_1$ of origin O1. The inertial measurement unit IMU1 has three angle sensors 121.1, 122.1, and 123.1 that are mounted about the axes X1, Y1, and Z1 for detecting turning of the accelerometer measurement reference frame $m_1$ relative to an inertial reference frame.

The inertial measurement unit IMU2 has three accelerometers 111.2, 112.2, and 113.2 arranged on the axes X2, Y2, and Z2 of an accelerometer reference frame $m_2$ of origin $O_2$. Three angle sensors 121.2, 122.2, and 123.2 are mounted about the axes X2, Y2, and Z2 for detecting turning of the accelerometer measurement reference frame $m_2$ relative to an inertial reference frame.

The inertial measurement units IMU1 and IMU2 are fastened by means of strapdown-type mountings on supports that are not necessarily rigid and that are themselves mounted in a carrier vehicle without knowledge of the angular difference between the two reference frames $m_1$ and $m_2$. The inertial measurement units IMU1 and IMU2 are arranged to measure the same specific force in the form of a specific force vector. The inertial measurement units IMU1 and IMU2 are also arranged to make it possible to use the gyro measurements to determine an instantaneous rotation vector and the turning of the accelerometer measurement reference frames $m_1$, $m_2$ relative to the inertial reference frames $[i_1]$, $[i_2]$. It should be observed that, in the present embodiment, both inertial measurement units IMU1 and IMU2 are preferably positioned in the vicinity of each other, i.e. close enough together for the lever arm between them to be negligible.

In this example, the electronic control circuit 10 comprises a processor and a memory storing programs that are executed by the processor. These programs comprise instructions arranged to perform both a navigation method and also a monitoring method for monitoring the inertial measurement units IMU1 and IMU2. The navigation method (for determining position) may be performed by a pure inertial navigation system or by an attitude and heading reference system (AHRS) or indeed by navigation apparatus that is hybrid, e.g. both inertial and GPS (global positioning system). The navigation method performed is itself known and is not described in greater detail herein since it is independent of the monitoring method constituting the subject matter of the invention.

In accordance with the monitoring method of the invention, the electronic processor circuit 10 performs the steps of:

projecting the specific force vectors as determined by each of the inertial measurement units into an inertial reference frame by using the gyro measurements;

comparing the two specific force vectors as projected into said reference frame with each other in order to determine a difference between them; and monitoring variation in this difference over time.

In this example, the specific force vectors are compared by comparing the outputs from the accelerometers of the two inertial measurement units IMU1 and IMU2 in pairs after these outputs have been projected into the inertial reference frame associated with each inertial measurement unit IMU1, IMU2.

The monitoring method makes it possible to retrieve error differences in the inertial measurements supplied by the accelerometers and by the gyros, and to do so by using the gyro measurements to observe the differences between the specific forces projected into the inertial reference frame and without performing inertial navigation.

The processing of the measurements from the inertial measurement units is described below in detail. In the description below, the following notation is used:

$[m_1]$: the reference frame of IMU1
$[m_2]$: the reference frame of IMU2
$[i_1]$: the inertial reference frame as stabilized by integrating the gyro measurements of IMU1
$[i_2]$: the inertial reference frame as stabilized by integrating the gyro measurements of IMU2
$[i]$: the nominal inertial reference frame (with its Z axis along the axis of rotation of the Earth)
$[g]$: the local geographical reference frame (using the NWD convention)
$\psi$: the attitude vector in $[i]$ (the integral from 0 to t of the three gyro drifts projected into the nominal inertial reference frame $[i]$)
f: the specific force vector (accelerometer measurements), also written fs
$G_g$: the gravity vector in the local geographical reference frame $[g]$ having the components (0, 0, g)'
$\gamma_g$: the acceleration vector relative to the Earth in $[g]$
$\delta A_1$: the measurement error vector of the accelerometers of IMU1
$\delta A_2$: the measurement error vector of the accelerometers of IMU2
$\hat{T}_{im}$: the transformation matrix for transforming from m to i as obtained by integrating the gyro measurements (e.g. via a quaternion)
$\hat{T}_{i_1 m_1}$: the calculated transformation matrix for transforming from $m_1$ to $i_1$
$\hat{T}_{i_2 m_2}$: the calculated transformation matrix for transforming from $m_2$ to $i_2$
$D_m$: the geometrical drift vector of an IMU
I: the identity matrix
X: the state vector
Y: the observation vector
$\hat{V}$: an estimate or a measurement of the magnitude V $$A(X) = \begin{bmatrix} 0 & -z & y \\ z & 0 & -x \\ -y & x & 0 \end{bmatrix}:$$

the antisymmetric matrix of X

The projection of the specific forces (fs) of each inertial measurement unit IMU1, IMU2 into its inertial reference frame $i_1$, $i_2$ as prepared by the inertial measurement units IMU1, IMU2 from their respective gyro measurements is written in the form:

$$\hat{f}_{i_1} = \hat{T}_{i_1 m_1} \cdot \hat{f}_{m_1}$$

$$\hat{f}_{i_2} = \hat{T}_{i_2 m_2} \cdot \hat{f}_{m_2}$$

By way of example, the transformation matrix $\hat{T}_{i_1 m_1}$ is obtained by integrating a quaternion on the basis of the following differential equation (the same calculation is performed for the IMU2):

$$\dot{\hat{T}}_{im} = \hat{T}_{im} \cdot A(\Omega_m^{m/i})$$

In this position, $\Omega_m^{m/i}$ corresponds to the three measurements from a trihedron of gyros (for each inertial measurement unit IMU1 and IMU2).

At time t=0, the following applies:

$$\hat{T}_{i_1 m_1} = I \text{ and } \hat{T}_{i_2 m_2} = I;$$

whence at t=0

$$T_{i_1 i_2} = T_{i_1 m_1} \cdot T_{m_1 m_2} \cdot T_{m_1 i_2} = I \cdot T_{m_1 m_2} \cdot I = T_{m_1 m_2}$$

Thus, at time t=0, [i₁] and [i₂] are very close together, since [m₁] is assumed to be close to [m₂], given that the inertial measurement units IMU1 and IMU2 are assumed to be mounted parallel to within a few degrees, or one of the two reference frames has previously been compensated by a harmonization angle that is known to within a few degrees.

The following can then be written for the inertial measurement unit IMU1 (ignoring Coriolis acceleration, which is common to both measurements):

$$\hat{f}_{m_1} = T_{m_1 g}(\gamma_g - G_g) + \delta A_1$$

The same formula (with changed subscripts) is applied for the inertial measurement unit IMU2 and it is possible to calculate the difference between the two specific forces, each as projected into the inertial reference frame [i₁], [i₂] of the corresponding inertial measurement unit IMU1. IMU2:

$$\Delta \hat{f}_i \approx \hat{f}_{i_2} - \hat{f}_{i_1} =$$
$$\hat{T}_{i_2 m_2} \cdot [T_{m_2 g}(\gamma_g - G_g) + \delta A_2] - \hat{T}_{i_1 m_1} \cdot [T_{m_1 g}(\gamma_g - G_g) + \delta A_1]$$

The following notation is used $\hat{T}_{im} = [I + A(\psi)] \cdot T_{im}$ and it is observed that $I + A(\psi)$ represents a micro-rotation matrix of angle $\psi$.

The error vector $\psi$ corresponds to the integral of the drift vector projected into the inertial reference frame:

$$\psi(t) = \int_0^t T_{im}(\tau) \cdot D_m(\tau) \cdot d\tau$$

Whence:

$$\Delta \hat{f}_i = [I + A(\psi_2)] T_{i_2 m_2}[T_{m_2 g}(\gamma_g - G_g) + \delta A_2] -$$
$$[I + A(\psi_1)] T_{i_1 m_1}[T_{m_1 g}(\gamma_g - G_g) + \delta A_1]$$

The following notation is used $T_{i_2 i_1} = I + A(\psi_0)$, which represents a micro-rotation matrix for transforming from the inertial reference frame [i₁] to the inertial reference frame [i₂]. This matrix is constant.

By developing the above formula while retaining first order errors only, the following is obtained:

$$\Delta \hat{f}_i \approx T_{i_2 m_2} \delta A_2 - T_{i_1 m_1} \delta A_1 + T_{i_2 g}(\gamma_g - G_g) -$$
$$T_{i_1 g}(\gamma_g - G_g) + A(\psi_2) T_{i_2 g}(\gamma_g - G_g) - A(\psi_1) T_{i_1 g}(\gamma_g - G_g)$$

$$\Delta \hat{f}_i \approx (I + A(\psi_0)) \cdot T_{i_1 m_1} \cdot \delta A_1 - T_{i_1 m_1} \cdot \delta A_1 + (I + A(\psi_0)) T_{i_1 g}(\gamma_g - G_g) -$$
$$T_{i_1 g}(\gamma_g - G_g) + A(\psi_2) \cdot (I + A(\psi_0)) T_{i_1 g}(\gamma_g - G_g) - A(\psi_1) T_{i_1 g}(\gamma_g - G_g)$$

$$\Delta \hat{f}_i \approx T_{i_1 m_1} \cdot T_{m_1 m_2} \delta A_2 - T_{i_1 m_1} \delta A_1 + A(\psi_0 + \psi_2 - \psi_1) T_{i_1 g}(\gamma_g - G_g)$$

As mentioned above, $T_{m_1 m_2}$ is close to I, whence, by using the measurements from the measurement unit IMU1:

$$\Delta \hat{f}_i \approx T_{i_1 m_1} \cdot (\delta A_2 - \delta A_1) + A(\psi_0 + \psi_2 - \psi_1) \cdot T_{i_1 g} \cdot (\gamma_g - G_g)$$

This error equation contains both the accelerometer contribution and the gyro contribution to the overall error.

In the same manner, by using the measurements from the measurement unit IMU2, the following is obtained:

$$\Delta \hat{f}_i \approx T_{i_2 m_2} \cdot (\delta A_2 - \delta A_1) + A(-\psi_0 + \psi_2 - \psi_1) \cdot T_{i_2 g} \cdot (\gamma_g - G_g)$$

This error equation likewise contains both the accelerometer contribution and the gyro contribution to the overall error.

For real time implementation in inertial equipment, use is made of the measurements that are available, namely:

$$\Delta \hat{f}_i \approx \hat{T}_{i_1 m_1} \cdot (\delta A_2 - \delta A_1) + A(\Psi_0 + \Psi_2 - \Psi_1) \cdot \hat{f}_{i_1}$$

Using the notation $\Delta A = \delta A_2 - \delta A_1$ and $\Delta \psi = \psi_0 + \psi_2 - \psi_1$ in the above formula, the following is obtained:

$$\Delta \hat{f}_i \approx \hat{T}_{i_1 m_1} \Delta A + A(\Delta \psi) \cdot \hat{f}_{i_1}$$

Knowing that $A(X)Y = -A(Y)X$, this gives:

$$\Delta \hat{f}_i \approx \hat{T}_{i_1 m_1} \Delta A - A(\hat{f}_{i_1}) \cdot \Delta \psi$$

or in a different form:

$$\Delta \hat{f}_i \approx \hat{T}_{i_2 m_2} \Delta A - A(\hat{f}_{i_2}) \cdot \Delta \psi$$

with a different definition for $\Delta \psi$.

In the above two equations, the terms $\Delta A$ and $\Delta \psi$ are the unknowns, with all the other magnitudes being known in real time. This can be written in matrix form (in which j corresponds to the subscript 1 or 2 specifying the inertial measurement unit from which the measurements are taken):

$$Y = [\Delta \hat{f}_i] = [\hat{T}_{i_j m_j} \quad -A(\hat{f}_{i_j})] \cdot \begin{bmatrix} \Delta A \\ \Delta \Psi \end{bmatrix} = H \cdot X$$

This matrix equation, referred to as the measurement equation (Y=H·X), can be processed by estimator means of the least squares type or by a Kalman filter, Y being the measurement vector, X being the state vector, and H being the observation matrix.

This matrix equation can also be written in the form Y=H·X+V, where V is a white noise vector suitable for modelling the noise in the acceleration measurements.

In order to reduce the effect of noise, it is also possible to use the integral of this measurement equation as a function of time. This also facilitates potential compensation of lever arms if the two inertial measurement units IMU1 and IMU2 are more than a few meters apart. Specifically, under such circumstances, it is preferable to refer both specific forces to the same reference point, while compensating for the lever arm that exists between the inertial measurement units, so as to make the differences insensitive to turning of the carrier. This compensation of the lever arm is written as follows:

$$\text{compensated} \int_{t1}^{t2} \Delta \hat{f}_i \cdot dt = \int_{t1}^{t2} (\hat{f}_{i_2} - \hat{f}_{i_1}) dt - \hat{T}_{i_1 m_1} (\vec{R} \wedge \vec{\Omega}_{m_1/i})$$

where $\vec{R}$ is the lever arm vector between the inertial measurement units IMU1 and IMU2 (the distance between the two IMUs in $[m_1]$) and $\vec{\Omega}_{m_1/i}$ is the instantaneous speed of rotation vector of the IMU1 relative to the inertial reference frame [i] that may be provided by the gyro measurements from a selected one of the two inertial measurement units.

The measurement equation then becomes:

$$\Delta \hat{f}_i \approx \hat{T}_{i_1 m_1} \Delta A - A(\hat{f}_{i_1}) \cdot \Delta \Psi$$

The integration window (t2−t1) can be adjusted as a function of the desired detection threshold.

If a Kalman filter is used for estimating the state vector X, it is possible to apply a "conformal" statistical model to the accelerometer and gyro errors (a Markov model), in which case comparing the estimates with the standard deviations provided by the filter serves to identify any non-conformity of a sensor.

To do this, it is necessary to increase the size of the state vector and to add the following differential equation thereto, linking $\Delta \psi$ and the derivatives:

$$\Delta \dot{\Psi} = T_{im} \cdot \Delta D_m \text{ and } \Delta \psi(t=0) = \psi_0$$

This gives the following new equations:
the measurement equation:

$$Y = \left[ \text{compensated} \int_{t1}^{t2} \Delta \hat{f}_i \cdot dt \right] =$$

$$H \cdot X = \left[ \int_{t1}^{t2} \hat{T}_{i_1 m_1} dt \quad -\int_{t1}^{t2} A(\hat{f}_{i_1}) dt \quad 0 \right] \cdot \begin{bmatrix} \Delta A \\ \Delta \Psi \\ \Delta D_m \end{bmatrix}$$

and the state variation equation:

$$\dot{X} = F \cdot X + U \text{ with: } F = \begin{bmatrix} F_A & 0 & 0 \\ 0 & 0 & \hat{T}_{i_1 m} \\ 0 & 0 & F_D \end{bmatrix} \text{ and } U = \begin{bmatrix} U_A \\ U_\psi \\ U_D \end{bmatrix}$$

The sub-matrices $F_A$ and $F_D$ serve to define the Markov models of the sensor errors $\Delta A$ and $\Delta D_m$, in association with the state noise $U_A$ and $U_D$. The white noise term $U_\psi$ serves to define drift white noise, commonly referred to as angular random walk.

Thus, the monitoring method can reveal behavior of one of the two inertial measurement units that is not in conformity with the expected model for variation over time concerning the sensors (typically a model of the Markov type). After detecting this behavior, the method can be arranged to issue an alert in order to warn the user. Nevertheless, with only two inertial measurement units being monitored, the method does not make it possible to isolate (or to identify) which one of the two inertial measurement units IMU is presenting behavior that is not in conformity. In contrast, it should be observed that when the method is performed with three inertial measurement units, it enables the faulty inertial measurement unit to be identified. For this purpose, it suffices to apply the method on the three inertial measurement units taken in pairs (with inertial measurement units IMU1, IMU2, and IMU3, respective differences detected between the specific force vectors of the inertial measurement units IMU1 and IMU2 and between the specific force vectors of the inertial measurement units IMU2 and IMU3 leads to identifying nonconformity concerning the inertial measurement unit IMU2 that is common to both comparisons).

Concerning the observability of $\Delta \psi$, it should be observed that:

in the simplified measurement equation $\Delta \hat{f}_i = -A(\hat{f}_{i_1}) \cdot \Delta \psi$, the product $A(\hat{f}_{i_1}) \cdot \Delta \psi$ corresponds to the vector product of the vectors $\hat{f}_{i_1}$ and $\Delta \psi$;

if both vectors are curvilinear, then the vector product is zero. It is therefore possible to observe only the projection of $\Delta \psi$ in a plane perpendicular to $\hat{f}_{i_1}$.

Thus, by repositioning in the local geographical reference frame, given that the specific force is due mostly to gravity, it is possible to observe only those effects of drift that lie in the horizontal plane. This is true for observation of a duration that is short compared with the period of the Earth's rotation (24 h).

Naturally, the invention is not limited to the embodiments described and covers any variant coming within the ambit of the invention as defined by the claims.

In particular, both inertial measurement units may be mounted in the same piece of equipment, as in the embodiment described, or else they may be mounted in distinct pieces of equipment.

The accelerometers and/or the gyros may be of any type and may comprise gyros having a vibrating axisymmetric resonator, e.g. of the hemispherical resonator gyro (HRG) type, or micro-electromechanical systems (MEMS).

The invention can be used without compensation for the lever arm, providing the inertial measurement units are close enough to each other. By way of example, for a civil airplane, no compensation need to be performed when the inertial measurement units are less than three meters apart from each other. Nevertheless, this value depends on the acceptable level of failure, and on the sensitivity of the inertial measurement units.

In a variant, during a stage of operation in which the inertial measurement units are considered as operating nominally, the method may include the step of determining an alignment difference and a lever arm residual from the difference between the specific force vector is projected into the inertial reference frame. Thus, in the formula:

$$\text{compensated} \int_{t1}^{t2} \Delta \hat{f}_i \cdot dt = \int_{t1}^{t2} (\hat{f}_{i_2} - \hat{f}_{i_1}) dt - \hat{T}_{i_1 m_1}(\vec{R} \wedge \vec{\Omega}_{m_1/i})$$

the last member of the equation $\beta \hat{T}_{i_1 m_1}(\vec{R} \wedge \vec{\Omega}_{m_1/i})$ may be incorporated in H·X, thereby enabling the components of the lever arm to be added into the state vector X, and thus enabling it to be estimated by the Kalman filter. This may be the absolute lever arm, or it may be the residual of the lever arm, if it is already compensated in part since it is not known accurately.

The invention applies to any system making use of inertial measurement units. The invention thus applies to an attitude and heading reference system (AHRS), which may be subdivided into an inertial measurement unit and a porcelain performing healing and attitude calculations.

The invention claimed is:

1. A method of monitoring at least first and second inertial measurement units mounted on a common carrier, the first inertial measurement unit and the second inertial measurement unit being connected to the same electronic processor circuit and being arranged to determine both a specific force vector in an accelerometer measurement reference frame and also rotation data concerning turning of the accelerometer measurement reference frame relative to an inertial reference frame; wherein the measurement units are mounted so they are parallel to each other to within a few degrees or one of the two reference frames is previously compensated by a harmonization angle; and wherein the electronic processor circuit performs the steps of:
   for each inertial measurement unit, projecting the specific force vector into the inertial reference frame by using the rotation data, the inertial reference frame corresponding to the measurement reference frame at a time t=0;
   comparing the specific force vectors as projected into said reference frames with each other in order to determine a difference between them; and
   monitoring variation in this difference over time.

2. The method according to claim 1, wherein each of the first and second inertial measurement units has three accelerometers, each arranged along a respective axis of the accelerometer reference frame, and three gyros, each arranged to measure the orientation of the accelerometer measurement reference frame relative to the inertial reference frame, and the specific force vectors are compared by comparing the outputs of the accelerometers of the two inertial measurement units in pairs after the outputs have been projected into the inertial reference frame.

3. The method according to claim 1, wherein the two measurement units are spaced apart from each other, and the method includes the step of compensating for a lever arm between the two measurement units.

4. The method according to claim 3, including, during a stage of operation in which the inertial measurement units are operating nominally, the step of determining an alignment difference and a lever arm residual from the difference between the specific force vectors as projected into the inertial reference frame.

5. The method according to claim 1, including the step of deducing errors of the inertial measurement units from the difference.

6. The method according to claim 5, including the step of comparing the errors of the inertial measurement units with a model for variation over time of the errors of the inertial measurement units.

7. A vehicle navigation apparatus comprising at least first and second inertial measurement units connected to a same electronic processor circuit, each of the inertial measurement units being arranged to determine both a specific force vector in an accelerometer measurement reference frame and also rotation data concerning turning of the accelerometer measurement reference frame relative to an inertial reference frame; wherein the measurement units are mounted so they are parallel to each other to within a few degrees or one of the two reference frames is previously compensated by a harmonization angle; and wherein the electronic processor circuit is arranged to perform the steps of:
   for each inertial measurement unit, projecting the specific force vector into the inertial reference frame by using the rotation data, the inertial reference frame corresponding to the measurement reference frame at a time t=0;
   comparing the specific force vectors as projected into said reference frames with each other in order to determine a difference between them; and
   monitoring variation in this difference over time.

8. The apparatus according to claim 7, wherein each of the first and second inertial measurement units has three accelerometers, each arranged along a respective axis of the accelerometer reference frame, and three gyros, each arranged to measure the orientation of the accelerometer measurement reference frame relative to the inertial reference frame, and the specific force vectors are compared by comparing the outputs of the accelerometers of the two inertial measurement units in pairs after the outputs have been projected into the inertial reference frame.

9. The apparatus according to claim 7, wherein the two measurement units are spaced apart from each other, and the electronic processor circuit is arranged to compensate for a lever arm between the two measurement units.

10. The apparatus according to claim 9, including, during a stage of operation in which the inertial measurement units are operating nominally, the step of determining an alignment difference and a lever arm residual from the difference between the specific force vectors as projected into the inertial reference frame.

11. The method according to claim 7, the electronic processor circuit is arranged to deduce errors of the inertial measurement units from the difference.

12. The method according to claim 11, the electronic processor circuit is arranged to compare the errors of the inertial measurement units with a model for variation over time of the errors of the inertial measurement units.

* * * * *